United States Patent
Nakanishi et al.

(10) Patent No.: US 11,922,014 B2
(45) Date of Patent: Mar. 5, 2024

(54) MEMORY SYSTEM AND METHOD

(71) Applicant: Kioxia Corporation, Tokyo (JP)

(72) Inventors: Keiri Nakanishi, Kawasaki Kanagawa (JP); Kensaku Yamaguchi, Kawasaki Kanagawa (JP); Takashi Takemoto, Yokohama Kanagawa (JP)

(73) Assignee: Kioxia Corporation, Tokyo (JP)

(*) Notice: Subject to any disclaimer, the term of this patent is extended or adjusted under 35 U.S.C. 154(b) by 0 days.

(21) Appl. No.: 17/903,636

(22) Filed: Sep. 6, 2022

(65) Prior Publication Data
US 2023/0142767 A1    May 11, 2023

(51) Int. Cl.
*G06F 3/06* (2006.01)

(52) U.S. Cl.
CPC .......... *G06F 3/0604* (2013.01); *G06F 3/0631* (2013.01); *G06F 3/0659* (2013.01); *G06F 3/0679* (2013.01)

(58) Field of Classification Search
CPC .... G06F 3/0604; G06F 3/0679; G06F 3/0659; G06F 3/0631
See application file for complete search history.

(56) References Cited

U.S. PATENT DOCUMENTS

| | | | |
|---|---|---|---|
| 9,047,177 B2 | 6/2015 | Matsudaira et al. | |
| 10,310,984 B2 | 6/2019 | Kawamura | |
| 10,686,468 B2 | 6/2020 | Matsuo et al. | |
| 11,740,818 B2* | 8/2023 | Cheah | G06F 3/0673 710/68 |
| 2016/0004642 A1* | 1/2016 | Sugimoto | G06F 12/0871 711/128 |
| 2018/0024748 A1 | 1/2018 | Hahn et al. | |
| 2019/0079861 A1 | 3/2019 | Amaki et al. | |
| 2021/0311656 A1* | 10/2021 | Ryu | G06F 3/0604 |

FOREIGN PATENT DOCUMENTS

| | | |
|---|---|---|
| JP | 2013-196115 A | 9/2013 |
| JP | 2019-053415 A | 4/2019 |
| JP | 2019-102027 A | 6/2019 |

* cited by examiner

*Primary Examiner* — Mark A Giardino, Jr.
(74) *Attorney, Agent, or Firm* — Allen & Overy LLP

(57) ABSTRACT

According to one embodiment, a controller of a memory system manages a first table maintaining a relationship between a logical address and a physical address, compresses first data corresponding to a first address of a write command, specifies a size of second data obtained by compressing the first data, determines allocation of the second data on a memory based on the size of the second data, stores a second address corresponding to a physical area where a head of the second data is stored and a physical area number used to store the second data in an entry of the first logical address in the first table, and stores the first address, offset of a position of a leader of the second data in the physical area, and the size of the second data in the physical area.

20 Claims, 13 Drawing Sheets

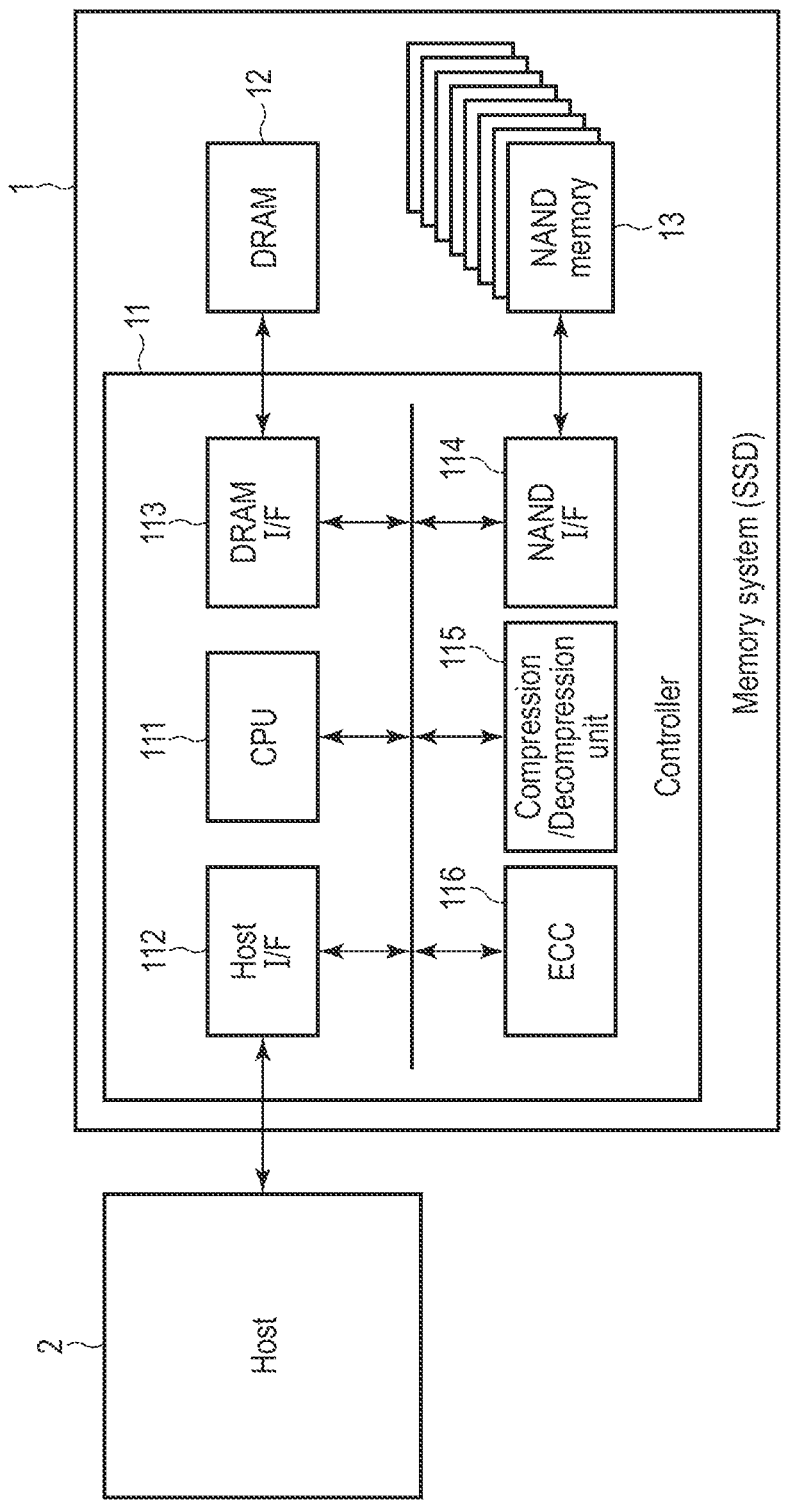
F I G. 1

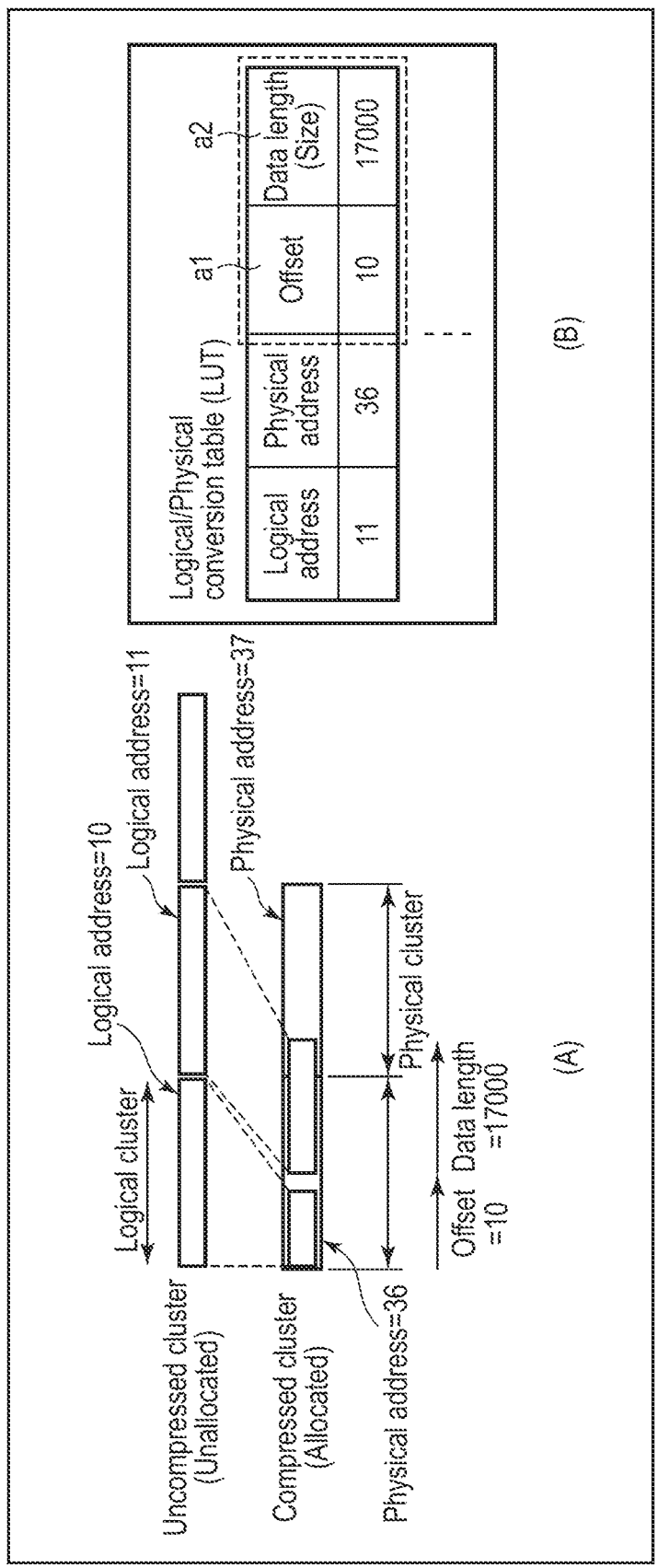
F I G. 2

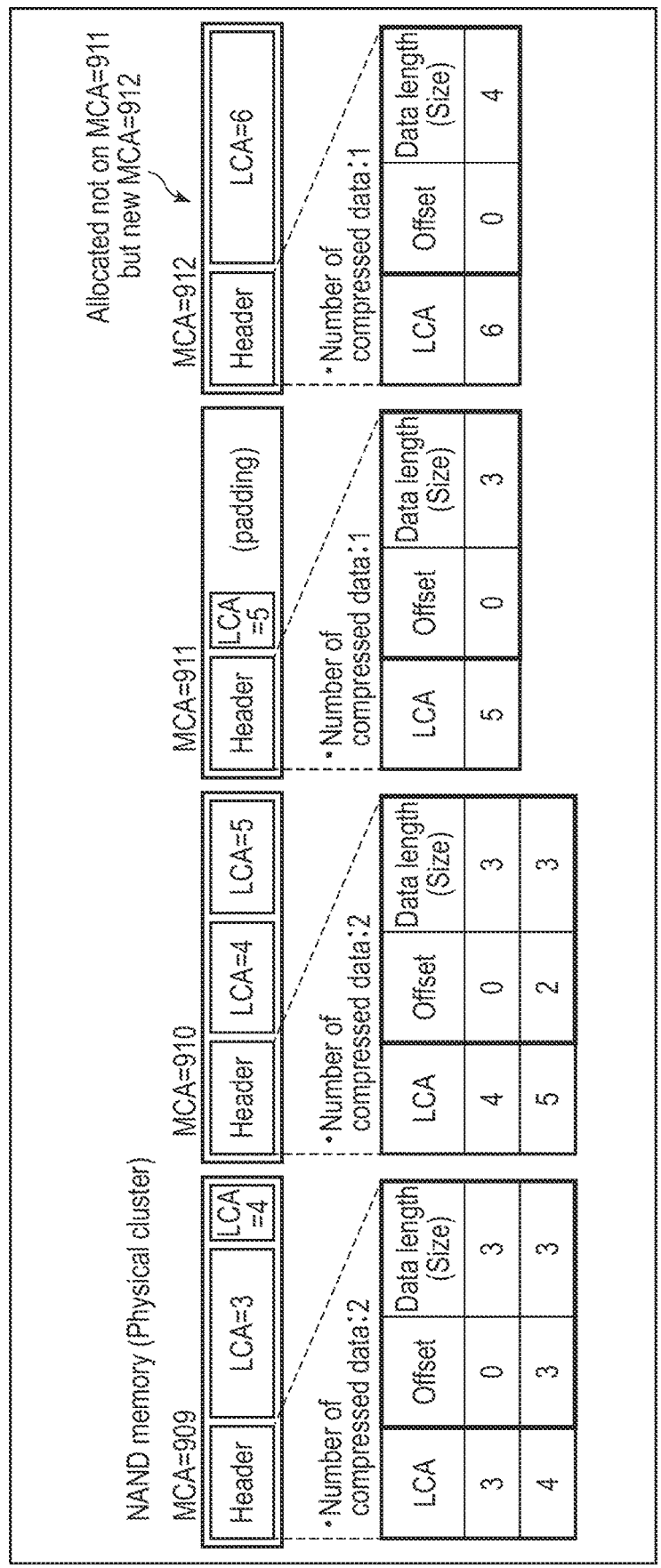
F I G. 5

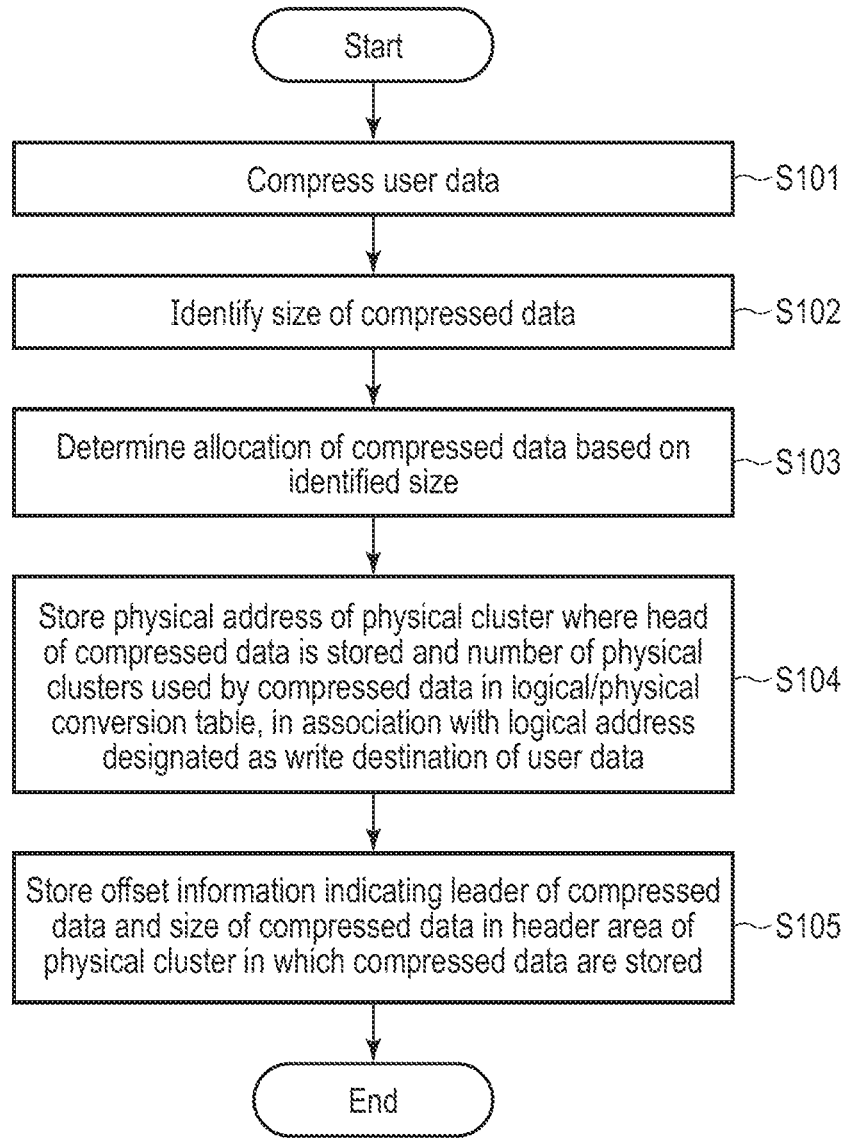
F I G. 6

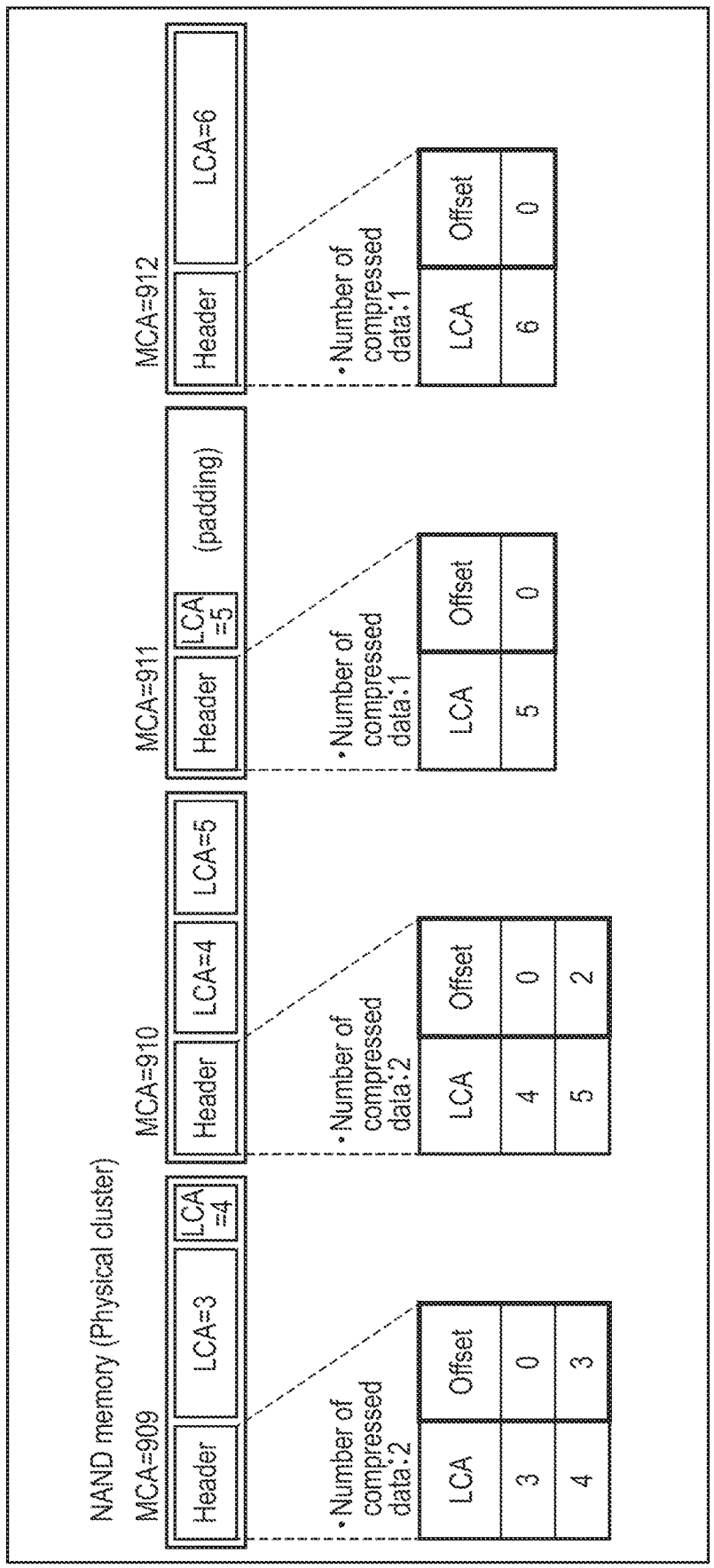
F I G. 9

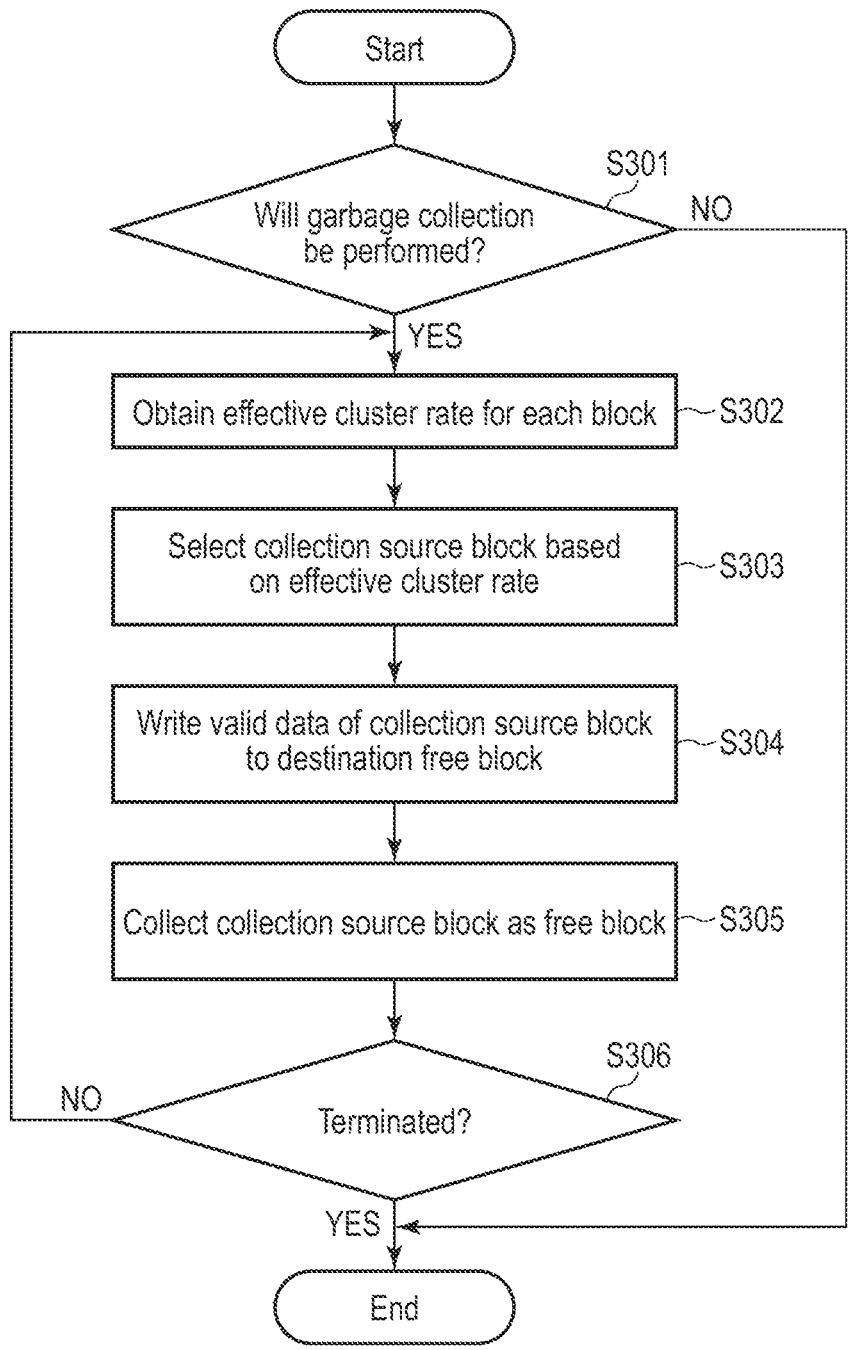
F I G. 10

MEMORY SYSTEM AND METHOD

CROSS-REFERENCE TO RELATED APPLICATIONS

This application is based upon and claims the benefit of priority from Japanese Patent Application No. 2021-183137, filed Nov. 10, 2021, the entire contents of which are incorporated herein by reference.

FIELD

Embodiments described herein relate generally to a memory system and a method.

BACKGROUND

Memory systems such as solid state drive (SSD) are widely used as storages for information processors such as server or personal computer (PC).

Furthermore, in recent years, there are many necessities of bulk data storage in business activities and the like for, for example, data mining, and thus memory systems having a function to compress and decompress data have become gradually popular.

If an SSD with a NAND flash memory (NAND memory) is used, a controller which controls the NAND memory manages a table to maintain a corresponding relationship between a logical address which logically indicates a position on a NAND memory used when a host (information processor) designates a storage location of data during issuing a write command and a read command, for example, and a physical address indicative of a physical position on the NAND memory. The table is, for example, referred to as logical/physical conversion table, or look up table (LUT). The controller uses a necessary part of the logical/physical conversion table which would be cached in, for example, a dynamic random access memory (DRAM).

Generally speaking, even if data of the same size are compressed, size of the compressed data is not constant. Thus, when a function to compress/decompress data is performed, and data of uneven sizes are compressed to be stored, information to be recorded in the logical/physical conversion table increases, and the size of the logical/physical conversion table will increase. It is preferable that the capacity of the cache area is increased in accordance with the above increase of the size; however, there may be a case where increase of the capacity of the cache area is difficult because of cost restriction and the like, and in such a case, a cache hit rate of the logical/physical conversion table decreases. The decrease in the cache hit rate of the logical/physical conversion table leads to decrease of I/O performance of the memory system.

BRIEF DESCRIPTION OF THE DRAWINGS

FIG. 1 is a diagram illustrating an example of a structure of a memory system of a first embodiment.

FIG. 2 is a diagram illustrating a memory system of a comparative example with a function to compress/decompress data.

FIG. 5 is a second diagram illustrating the operation related to compression/decompression of data of the memory system of the first embodiment.

FIG. 6 is a flowchart of a compression operation of data of the memory system of the first embodiment.

FIG. 9 is a diagram illustrating an example of data allocation to a physical cluster of a NAND memory of the memory system of the second embodiment.

FIG. 10 is a flowchart of an outline of garbage collection.

DETAILED DESCRIPTION

Figure 3:
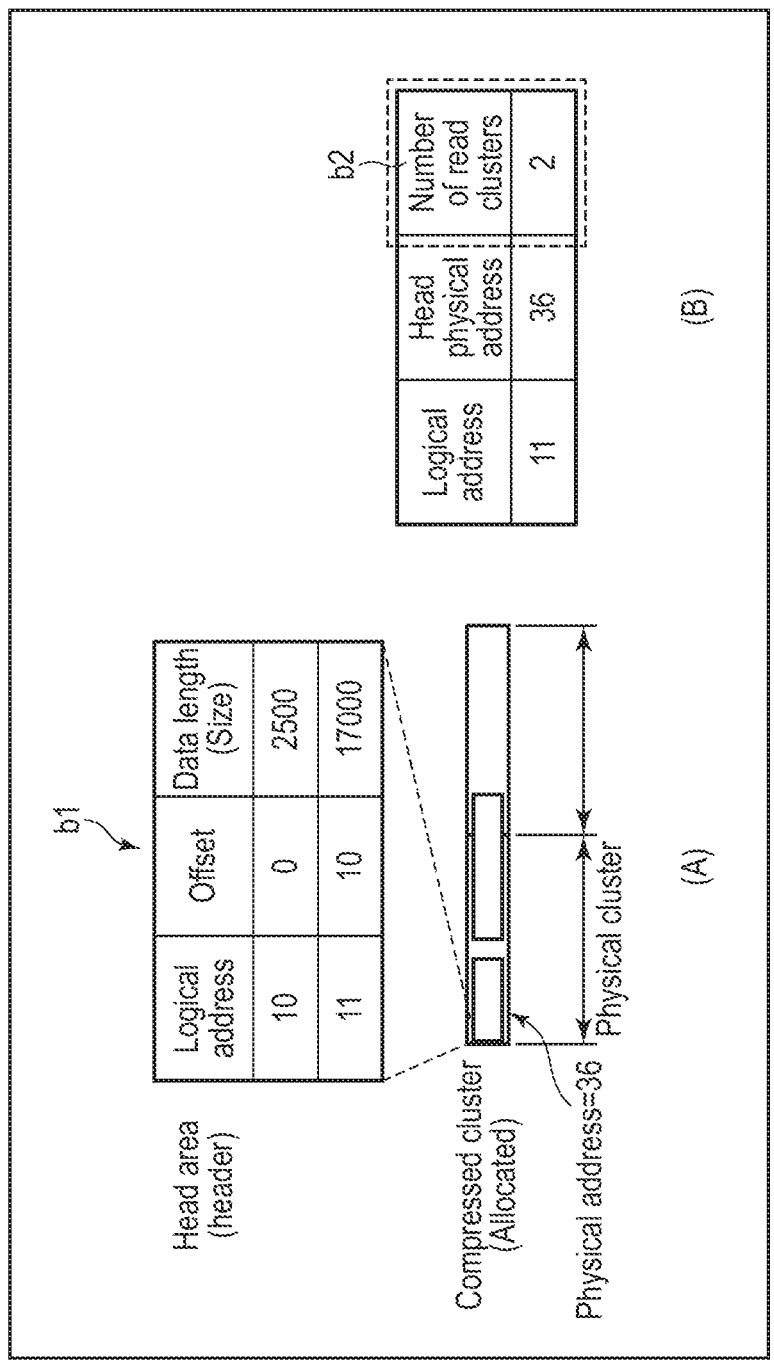
FIG. 3 is a diagram illustrating an example of allocation of data into a physical cluster of a NAND memory and a structure of a logical/physical conversion table (LUT) of the memory system of the first embodiment.

Embodiments will be described hereinafter with reference to the accompanying drawings.

In general, according to one embodiment, a memory system includes a nonvolatile memory and a controller. The controller is communicable with a host and configured to control the nonvolatile memory. The controller is configured to: manage a first table maintaining a corresponding relationship between an address designated by the host and an address indicative of a physical position of the nonvolatile memory; compress first data corresponding to a first address designated by a write command received from the host; specify a size of second data obtained by compressing the first data; determine allocation of the second data on the nonvolatile memory based on the size of the second data; store a second address which is an address corresponding to a physical area where a head of the second data is stored and a physical area number used to store the second data in an entry corresponding to the first address of entries of the first table; and store the first address, offset information indicative of a position of a leader of the second data in the physical area, and the size of the second data in a first area of the physical area where the second data are stored.

First Embodiment

Initially, the first embodiment will be explained.

FIG. 1 is a diagram illustrating an example of a structure of a memory system 1 of the first embodiment.

FIG. 1 also illustrates an example of the structure of an information processing system including the memory system 1 and a host 2 to which the memory system 1 is connected as storage. The host 2 is an information processor such as a server or PC.

The memory system 1 includes a controller 11, DRAM 12, and NAND flash memory (NAND memory) 13. Here, an example in which the memory system 1 is realized as an SSD is shown. The memory system 1 is not limited to SSD, and various types of nonvolatile memory can be mounted in place of the NAND memory 13. Furthermore, in this example, DRAM 12 is used as a work area of controller 11; however, instead of installing DRAM 12, it is possible to use, for example, static RAM (SRAM) can be built into or added to the controller 11.

The controller 11 controls an operation of the memory system 1. The controller 11 includes a central processing unit (CPU) 111, a host interface 112, a DRAM interface 113, a NAND interface 114, a compression/decompression unit 115, and an error check and correct (ECC) 116.

The CPU 111 executes control program (firmware) to implement the various processes executed by the controller 11. The various processes executed by the controller 11 include a write process to write data to the NAND memory 13 in response to a write command from the host 2, and a read process to read data stored in the NAND memory 13 in response to a read command from the host 2. In this example, the various processes executed by the controller 11 are realized by executing of firmware by the CPU 111; however, they may also be realized by specific hardware built in the controller 11.

The host interface 112 controls communication with the host 2 according to a predetermined communication standard. The DRAM interface 113 controls write of data to the DRAM 12 and read of data from the DRAM 12. The NAND interface 114 controls write of data to the NAND memory 13 and read of data from the NAND memory 13.

The compression/decompression unit 115 compresses write data requested to be written to the NAND memory 13 by a write command, or decompresses compressed data corresponding to the read data requested to be read from the NAND memory 13 by a read command. That is, the memory system 1 of the first embodiment is a memory system which has a function to compress and decompress data.

The ECC 116 performs error correction processing on the compressed data generated by the compression/decompression unit 115. Specifically, upon receipt of a write command, in case of an error occurring in future in the compressed data to be written to the NAND memory 13, the ECC 116 generates an error correction code to detect and correct such an error. Furthermore, upon receipt of a read command, the ECC 116 uses the error correction code to detect an error in the compressed data read from the NAND memory 13, and if an error is detected, the ECC 116 corrects the error.

For example, when a write command is issued from the host 2, the write command is received by the host interface 112. When a write command is received, the CPU 111 receives the write data via the host interface 112, and the write data are temporarily stored in the DRAM 12 via the DRAM interface 113.

The CPU 111 supplies the write data on the DRAM 12 to the compression/decompression unit 115, and instructs the compression/decompression unit 115 to compress the write data. When compressed data are generated by the compression/decompression unit 115, the CPU 111 supplies the compressed data to the ECC 116 and instructs the ECC 116 to generate an error correction code. The CPU 111 attaches the error correction code generated by the ECC 116 to the compressed data, and stores the compressed data with the error correction code to the NAND memory 13 via the NAND interface 114.

When a read command is issued from the host 2, for example, the read command is received by the host interface 112. When a read command is received, the CPU 111 reads the compressed data corresponding to the read data designated by the read command from the NAND memory 13 via the NAND interface 114. The CPU 111 temporarily stores the compressed data read from the NAND memory 13 in the DRAM 12 via the DRAM interface 113. The compressed data are marked with an error correction code generated during their writing to the NAND memory 13.

The CPU 111 supplies the compressed data on the DRAM 12 to the ECC 116, and instructs the ECC 116 to perform detection and correction of possible errors in the compressed data using the error correction code. The CPU 111 supplies the compressed data to which the detection and correction of error have been performed by the ECC 116 to the compression/decompression unit 115, and instructs the compression/decompression unit 115 to decompress the compressed data. The CPU 111 transmits read data obtained by the compression/decompression unit 115 decompressing the compressed data to the host 2 via the host interface 112.

By the way, write command and read command issued by the host 2 include a logical address which designates data storage locations. The logical address is an address which indicates the location in the logical address space of the memory system 1 provided with the host 2. In other words, the logical address is an address which logically indicates a location on the NAND memory 13.

On the other hand, the CPU 111 executes write of data to the NAND memory 13 and read of data from the NAND memory 13 via the NAND interface 114 using a physical address which indicates a location in the physical address space in which mapping to the logical address space is performed dynamically. The physical address indicates the physical location on the NAND memory 13.

Therefore, the CPU 111 has to perform address conversion to convert logical addresses to physical addresses. The address conversion may also be referred to as address resolution. For the address conversion, the CPU 111 manages a table which maintains corresponding relationship between logical and physical addresses. The table may be referred to as logical/physical conversion table or LUT. The CPU 111 stores the logical/physical conversion table in the NAND memory 13, and caches a predetermined portion of the logical/physical conversion table stored in the NAND memory 13 in the DRAM 12 for later use.

The logical addresses and physical addresses are assigned to each of logical areas of predetermined size in the logical address space and physical areas of predetermined size in the physical address space. A logical area of predetermined size may be referred to as logical cluster, and a physical area of predetermined size may be referred to as physical cluster. By managing the logical/physical conversion table which maintains the corresponding relationship between logical and physical addresses, the memory system 1 can dynamically associate logical clusters to physical clusters. The predefined size is a unit in which the host 2 manages the data on the memory system 1. The host 2 requests the memory system 1 to write or read data which are an integer multiple of the predetermined size.

On the other hand, the memory system 1 can execute write/read of data to/from the NAND memory 13 with a finer granularity than the physical cluster. Furthermore, the memory system 1 can erase data on the NAND memory 13 per block which is formed of a plurality of physical clusters. The block from which data are erased will be referred to as free block, for example. The memory system 1 secures free blocks, writes data to physical clusters of the free blocks, and when data are written to all physical clusters, secure new free blocks again.

The NAND memory 13 is a nonvolatile storage medium which cannot allow data to be overwritten to an area where data have already been written. Updating data is performed by invalidating the original data stored in one area and writing new data to another area. Therefore, over time, there is a possibility that blocks may occur in which the data in the majority of the areas have been invalidated. Therefore, the CPU 111 periodically or sequentially performs a process to generate free blocks by moving valid data in such blocks. The process of generating free blocks may be referred to as, for example, garbage collection.

For example, when writing write data to the NAND memory 13, the host 2 specifies the logical address and data length by a write command, and transmits the write data of specified data length to the memory system 1. If data compression is not performed, the number of logical clusters in the logical address space and the number of physical clusters in the physical address space used in the write data match. That is, logical clusters and physical clusters correspond one-to-one. Therefore, when data compression is not performed, the logical/physical conversion table should record, for example, the physical address associated with each logical address in each entry for the number of logical addresses.

In contrast, when compressing data, the number of logical clusters in the logical address space used for write data and the number of physical clusters in the physical address space used for compressed data generated by compressing write data are mismatched. There may possibly be a case where compressed data of data from two or more logical clusters are mixed together in one physical cluster. Therefore, when data compression is performed, the logical/physical conversion table needs to further include, in each entry for the number of logical addresses, in addition to the physical address, information and the like to extract compressed data corresponding to the data of the logical cluster indicated by the logical address from the compressed data stored in the physical cluster indicated by the physical address, from among the compressed data in the logical cluster indicated by the logical address.

Referring to FIG. 2, a memory system of a comparative example with a function to compress/decompress data will be explained.

FIG. 2(A) illustrates an example of a memory system of the comparative example, which compresses data received from the host and writes the compressed data to the NAND memory. On the other hand, FIG. 2(B) illustrates an example of various information recorded in the logical/physical conversion table by the memory system of the comparative example.

For example, it is considered that the memory system of the comparative example stores compressed data corresponding to the data of the logical cluster indicated by logical address "10" to the middle of the physical cluster indicated by physical address "36". In this example, it is considered that the data in the physical cluster are managed per subpage, in which the physical cluster is divided into 16 subpages, and that 10 subpages out of 16 subpages (0 to 15) are used. That is, it is considered that the end of this compressed data is located on ninth subpage.

Next, it is considered that the memory system of the comparative example stores the compressed data corresponding to the data of the logical cluster indicated by logical address "11" from the middle of the physical cluster indicated by logical address "36", following the compressed data corresponding to the data of the logical cluster indicated by logical address "10", which was stored immediately before. Specifically, it is considered that the data are stored from tenth subpage. It is also considered that the compressed data do not fit in the remaining six subpages and are stored across two physical clusters. The physical cluster indicated by physical address "36" and the physical cluster indicated by physical address "37" are physical clusters contained in the same block. The data length of the compressed data is considered to be 17,000 bytes. The data length varies depending on the contents of the data before compression, even if the data length of the data before compression is constant for logical clusters.

The memory system of the comparative example, as in FIG. 2(B), adds the offset information (a1) indicative of tenth subpage of 16 subpages and the data length (a2) to the entry corresponding to logical address "11" in all entries of the logical/physical conversion table, in addition to the physical address "36", with respect to the compressed data corresponding to the data of the logical cluster indicated by logical address "11".

By additionally storing the offset information (a1) and data length (a2) in the logical/physical conversion table, the memory system of the comparative example can retrieve the compressed data stored in the physical cluster with no excess or shortage. Specifically, for example, in a case of compressed data corresponding to the data in the logical cluster indicated by logical address "11", the memory system of the comparative example shall read 17,000 bytes of data from the tenth subpage of the physical cluster indicated by address "36" based on the logical/physical conversion table.

However, in the memory system of the comparative example, when it is considered that the offset information is recorded in 4 bits and the data length is recorded in 16 bits in the logical/physical conversion table, the logical/physical conversion table would increase by 20 bits per entry. Considering that the physical address is recorded in 28 bits, an increase of 20 bits from 28 bits to 48 (28+4+16) bits is made, which is an increase rate of 71.4%.

The logical/physical conversion table is used by caching the necessary portions in DRAM or the like. If capacity of cache area can be increased as the logical/physical conversion table increases, there is no problem; however, if the cache area cannot be increased due to cost or other reasons, the cache hit rate of the logical/physical conversion table will decrease. Decrease of the cache hit rate of the logical/physical conversion table leads to a reduction in the I/O performance of the memory system.

The Memory system 1 of the first embodiment suppresses the increase in the size of the logical/physical conversion table when operating the data compression/decompression function in order to suppress the increase of the capacity of the cache area for the logical/physical conversion table and improving the cache hit rate of the logical/physical conversion table to improve the I/O performance. This point will be described in detail below.

FIG. 3 is a diagram illustrating an example of allocation of data to a physical cluster of the NAND memory 13 of the memory system 1 of the first embodiment, and an example of the structure of the logical/physical conversion table (LUT) thereof.

FIG. 3(A) illustrates an example in which, as in the comparative example memory system described above, the physical cluster indicated by physical address "36" contains compressed data corresponding to the logical address "11" following the compressed data corresponding to the data of the logical cluster indicated by logical address "10".

In the memory system 1 of the first embodiment, the CPU 111 performing address conversion (address resolution) to convert a logical address into a physical address stores the offset information and data length of the compressed data to be stored in the logical/physical conversion table of the memory system of the comparative example in a head area (header) of the physical cluster with the logical address (b1). In this example, the area for storing the information pieces is located at the head of the physical cluster, but the location may be anywhere other than the head of the physical cluster.

On the other hand, FIG. 3(B) illustrates an example of various information recorded in the logical/physical conversion table as the data write shown in FIG. 3(A). The CPU 111 which stores the offset information and data length of compressed data in the physical cluster instead of the logical/physical conversion table stores the number of read clusters (b2) in the logical/physical conversion table because compressed data may be arranged across multiple physical clusters. For example, since the compressed data corresponding to the data in the logical cluster indicated by logical address "11" are stored across two physical clusters, the CPU 111 stores the read cluster number "2" in the entry corresponding to the logical address "11" in all entries of the logical/physical conversion table in addition to the head physical address "36".

When reading compressed data corresponding to the data in the logical cluster indicated by the logical address "11" from the NAND memory 13, the CPU 111 first reads all data of two physical clusters containing the compressed data based on the physical address "36" and the read cluster number "2" stored in the logical/physical conversion table. Next, the CPU 111 extracts the compressed data corresponding to the data in the logical cluster indicated by logical address "11" from the data in the two read physical clusters, based on the offset information and data length of the compressed data stored in the head area of the physical cluster indicated by physical address "36".

The bit sequence indicating the number of read clusters added to the logical/physical conversion table is sufficiently small compared to the bit sequence indicating the offset information and data length, and thus, the size increase of the logical/physical conversion table can be kept to a minimum. Therefore, the impact on the cache hit rate is small.

That is, the memory system 1 of the first embodiment performs a function to compress/decompress data by suppressing the increase in the size of the logical/physical conversion table, suppressing the increase in the capacity of the cache area for the logical/physical conversion table, and improving the cache hit rate of the logical/physical conversion table, thereby achieving improved I/O performance.

The detailed explanation of data compression/decompression of the memory system 1 of the first embodiment is further continued below.

In this example, the memory system 1 is considered to be an SSD with a capacity of 1 Tbyte (=1024×1024×1024× 1024 bytes). It is also considered that a logical address and a physical address are assigned to each 4 Kbytes of the 1 Tbyte memory area. The logical address and physical address are to be represented by 28 bits. As mentioned above, units to which logical and physical addresses are allocated is called a logical cluster or a physical cluster. A physical cluster is also referred to as media cluster. In the following, it is considered that clusters are managed per 1 Kbyte, not in per 16-divided subpages as described above.

First, the data compression operation of the memory system 1 is described.

Figure 4:
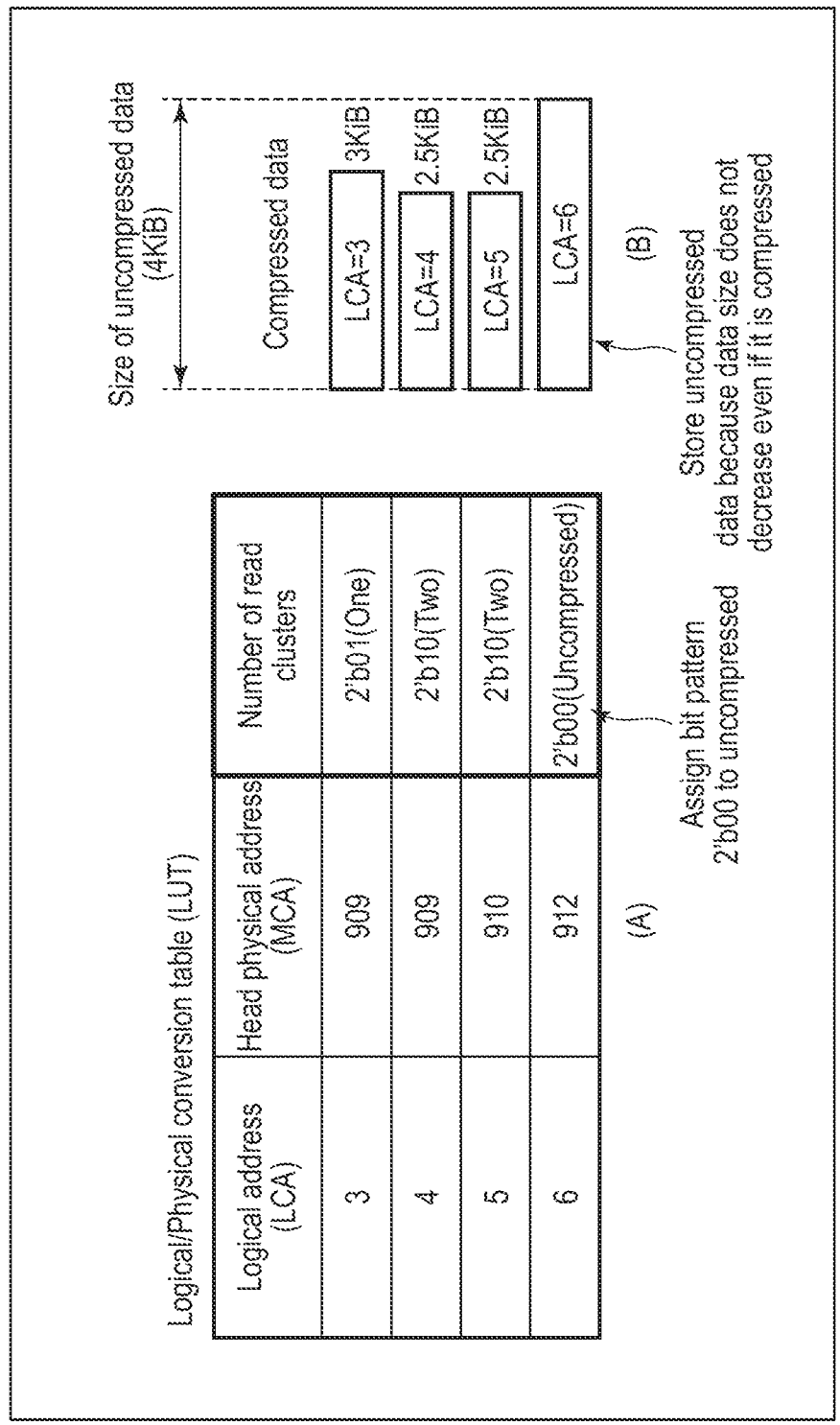
FIG. 4 is a first diagram illustrating an operation related to compression/decompression of data of the memory system of the first embodiment.

Considered here is a case where a logical cluster address (LCA)=3, 4, 5, and 6 is received from the host 2, and as a result of compressing data corresponding to each LCA, compression to the size as in FIG. 4(B) is made. For example, the data for LCA=4 have been compressed to 2.5 Kbytes, but on the physical cluster, the data are managed per 1 Kbyte, and thus, the data length (size) becomes 3. The CPU 111 first determines allocation of these compressed data on the NAND memory 13 and then, packs, as in FIG. 5, compressed data with LCA=3 in order. For example, considering that the compressed data with LCA=6 has become larger than before compression, the CPU 111 stores the LCA=6 data without compression. In the memory system 1 of the first embodiment, such uncompressed data shall be allocated without crossing physical clusters in order to save data read time from the NAND memory 13.

Once the allocation of the compressed data on the NAND memory 13 is determined, the CPU 111 adds physical address (media cluster address: MCA) of the compressed data (or uncompressed data if the data are larger than the original data) and physical cluster number required to read the compressed data to the entry corresponding to the target logical address in all entries of the logical/physical conversion table (LUT), as in FIG. 4(A). Note that, for example, "2'b" of "2'b01" of FIG. 4(A) indicates that the subsequent number sequence is a two-digit binary number. For example, compressed data with LCA=3 contain required data by reading one cluster with physical address=909, and compressed data with LCA=4 contain required data by reading two clusters with MCA=909 and 910. On the other hand, the number of read clusters is fixed to 1 for uncompressed data, and thus "2'b00" is inserted here to indicate that the data are uncompressed. Next, the CPU 111 packs the header and compressed data into the physical clusters of the NAND memory 13. In the memory system 1 of the first embodiment, the following information is included in the header.

(1) Number of compressed data in physical cluster
(2) Logical address information of compressed data contained in physical cluster
(3) Offset at which compressed data are allocated in physical cluster
(4) Compressed data size The header can be made variable in size by including (1), or it can be made fixed in size by setting an upper limit for (1). The CPU 111 packs the compressed data sequentially after including (1) to (4) in the header, and writes the data to the NAND memory 13 after error correction coding.

Next, the decompression operation of the compressed data of the memory system 1 is described.

When a read command for a logical address arrives from the host 2, the CPU 111 first determines the physical cluster to read by referring to the logical/physical conversion table (LUT). For example, if the read command is for LCA=4, it is understood that two physical clusters MCA=909 and 910 are to be read from the LUT. Since the number of clusters to be read is 2, not only are two physical clusters to be read out (since it is not "2'b00"), but also that the target clusters are compressed. Next, the CPU 111 reads the physical clusters MCA=909 and 910 from the NAND memory 13, and after performing the error correction decoding, refers to the header of MCA=909. The compressed data of LCA=4 start from 3 Kbyte of MCA=909 (because offset=3) and the data length=3, and thus, the CPU 111 first cuts out a 1 Kbyte portion up to the 4 Kbyte of MCA=909. The remaining 2 Kbytes are read from the beginning of the physical cluster of following MCA=910. With this, 3 Kbytes of compressed data of LCA=4 are cut. Next, the CPU 111 decompresses the 3 Kbytes of compressed data with LCA=4, and creates the read data of LCA=4 to be returned to the host 2.

Furthermore, for example, if a read command for LCA=6 arrives, since an address of physical cluster to be read from the LUT is MCA=912 and the number of clusters to be read is "2'b00", it is understood that it is uncompressed. Therefore, the CPU 111 reads the physical cluster with MCA=912, performs error correction decoding, and returns it to the host 2 without decompression.

FIG. 6 is a flowchart of the data compression operation of the memory system 1.

The memory system 1 compresses user data from the host 2 (S101). The memory system 1 identifies a size of the compressed data (S102). The memory system 1 determines allocation of the compressed data in the NAND memory 13 based on the identified size (S103).

The memory system 1 stores a physical address of a physical cluster where a head of the compressed data is stored and the number of physical clusters used by the compressed data in the logical/physical conversion table, in association with the logical address designated as the write destination of the user data (S104). Furthermore, the memory system 1 stores offset information indicating a start end of the compressed data and the size of the compressed data in a header area of the physical cluster in which the compressed data are stored (S105).

Figures 7, 8:
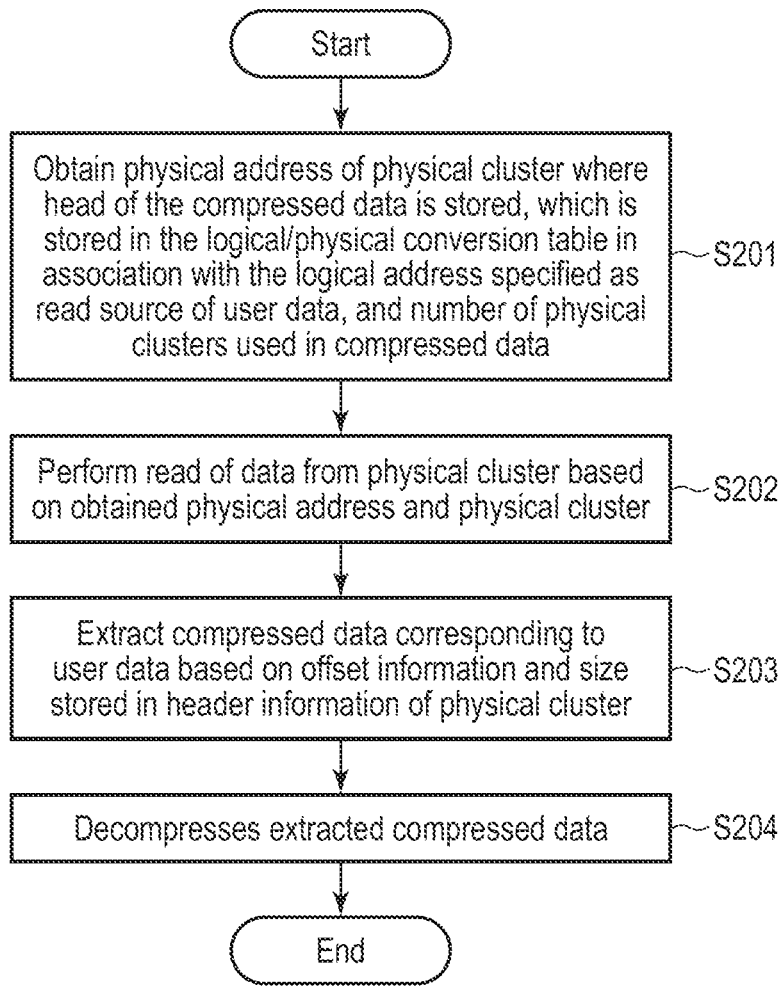
FIG. 7 is a flowchart of a decompression operation of compressed data of the memory system of the first embodiment.
FIG. 8 is a diagram illustrating an example of a logical/physical conversion table of a memory system of a second embodiment.

FIG. 7 is a flowchart of a decompression operation of compressed data of the memory system 1.

The memory system 1 obtains the physical address of the physical cluster where the head of the compressed data is stored, which is stored in the logical/physical conversion table in association with the logical address specified as the read source of the user data, and the number of physical clusters used in the compressed data (S201).

The memory system 1 performs read of data from the physical cluster based on the obtained physical address and physical cluster (S202). The memory system 1 extracts compressed data corresponding to the user data from the read data based on the offset information and size stored in the header information of the physical cluster (S203). Then, the memory system 1 decompresses the extracted compressed data (S204).

As described above, in the memory system 1 of the first embodiment, by storing the offset information and size of the compressed data in the header of the physical cluster of the NAND memory 13, such that the additional portion of the logical/physical conversion table is limited to the number of read clusters, and the size of the logical/physical conversion table is suppressed. By suppressing the size of the logical/physical conversion table, the memory system 1 of the first embodiment can suppress the increase in the capacity of the cache area for the logical/physical conversion table, improve the cache hit rate of the logical/physical conversion table, and thereby achieve improved I/O performance.

Second Embodiment

A second embodiment will be explained.

FIG. 8 is a diagram illustrating an example of a logical/physical conversion table of a memory system 1 of a second embodiment.

In the memory system 1 of the first embodiment, the number of read clusters is stored in the logical/physical conversion table as in FIG. 4(A). Furthermore, in the memory system 1 of the first embodiment, as in FIG. 5, the data length of the compressed data and the offset information are stored in the first area (header) of the physical cluster of the NAND memory 13.

In contrast, in a memory system 1 of the second embodiment, as in FIG. 8, a data length (cl) of compressed data is stored in the logical/physical conversion table. On the other hand, in the memory system 1 of the second embodiment, as shown in FIG. 9, a first area (header) of a physical cluster of NAND memory 13 does not store the data length of the compressed data, but only the offset information. Note that "3'b" of "3'b011" in FIG. 8 indicates, for example, is that the subsequent numeric sequence is a 3-digit binary number.

As described in the first embodiment, the CPU 111 executes garbage collection to generate free blocks periodically or sequentially.

In the garbage collection, blocks with the least number of valid data are targeted for garbage collection, and free blocks are generated by moving valid data to other blocks.

FIG. 10 is a flowchart of a rough procedure of the garbage collection.

The CPU 111 determines whether or not to perform the garbage collection (S301). For example, the CPU 111 determines that the garbage collection is to be performed when the number of free blocks is less than a threshold value. If it is determined that execution of garbage collection is unnecessary (S301: NO), the CPU 111 terminates the process.

If it is determined that the garbage collection is to be performed (S301: YES), the CPU 111 obtains an effective cluster rate for each block (S302). The effective cluster rate is a ratio of the area where valid data are stored to the total area in the block. If there is a large amount of invalidated data in a block, the effective cluster rate will be low.

The CPU 111 selects a collection source block based on the effective cluster rate (S303). The collection source block is a block from which valid data are transferred to other blocks. The CPU 111 selects the block with the lower effective cluster rate as the collection source block.

The CPU 111 writes the valid data of the collection source block to a destination free block (S304). After the write to the destination free block is performed, the data in the collection source block are invalidated. The CPU 111 then collects the collection source block from which the write to the destination free block has been performed as a free block (S305). Note that, erase of the data in the collection source block may be performed at the time of the collection, or immediately before it is used to write new data.

The CPU 111 determines whether or not to terminate the garbage collection by checking, for example, if the number of free blocks has reached or exceeded a threshold value (S306). If the condition for terminating garbage collection is not met (S306: NO), the CPU 111 repeats the process from S302. On the other hand, if the condition for terminate garbage collection is met (S306: YES), the CPU 111 terminates the process.

Here, the number of effective data in case of data compression is the sum of the effective compressed data sizes in the block. Furthermore, the memory system 1 of the second embodiment shall have a table which manages the amount of effective data for each physical block (effective data amount table) for garbage collection. The same applies to the memory system 1 of the first embodiment.

Figure 11:
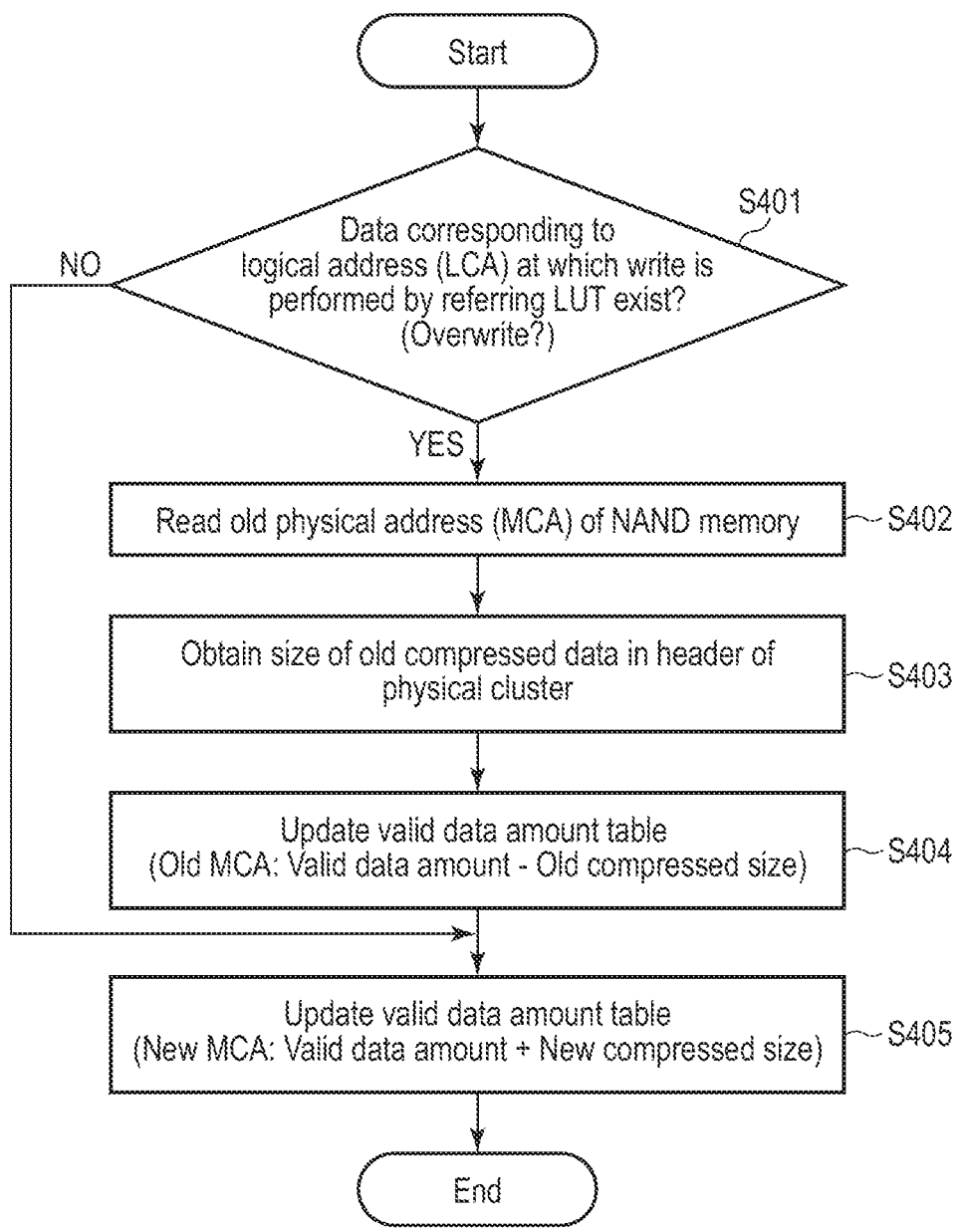
FIG. 11 is a flowchart of updating a valid data amount table of the memory system of the first embodiment.

A difference between the memory system 1 of the first embodiment and the memory system 1 of the second embodiment is in the control of the valid data amount table. When a write command arrives from the host 2, the CPU 111 updates the effective data amount table. First, update of the valid data amount table of the memory system 1 of the first embodiment will be explained with reference to FIG. 11, for comparison with the memory system 1 of the second embodiment.

When a write command arrives, the CPU 111 first determines whether or not old compressed data corresponding to the logical address specified by the command exist (whether or not it is an overwrite write) (S401). If the old compressed data exist (S401: YES), the CPU 111 searches for a physical address (MCA) where the old compressed data are stored. There may be several physical addresses. The CPU 111 then updates the effective data amount of the physical block to which the old physical address belongs.

Here, the size of the old compressed data is recorded in the header of the physical cluster of the NAND memory 13 in the memory system 1 of the first embodiment, and thus, the CPU 111 performs read of the NAND memory 13 to obtain the size of the old compressed data (S402). After reading the old compressed size from the header (S403), the CPU 111 subtracts the old compressed size from the number of valid data in the corresponding physical block (S404).

The CPU 111 must also update the amount of valid data in a newly written physical block, regardless of whether it is an overwrite (S405). In this example, a new compression size is added as the effective data amount of the physical block to which the physical address to which the new compressed data are written belongs. The above is the updating operation of the effective data amount table of the memory system 1 of the first embodiment.

Figure 12:
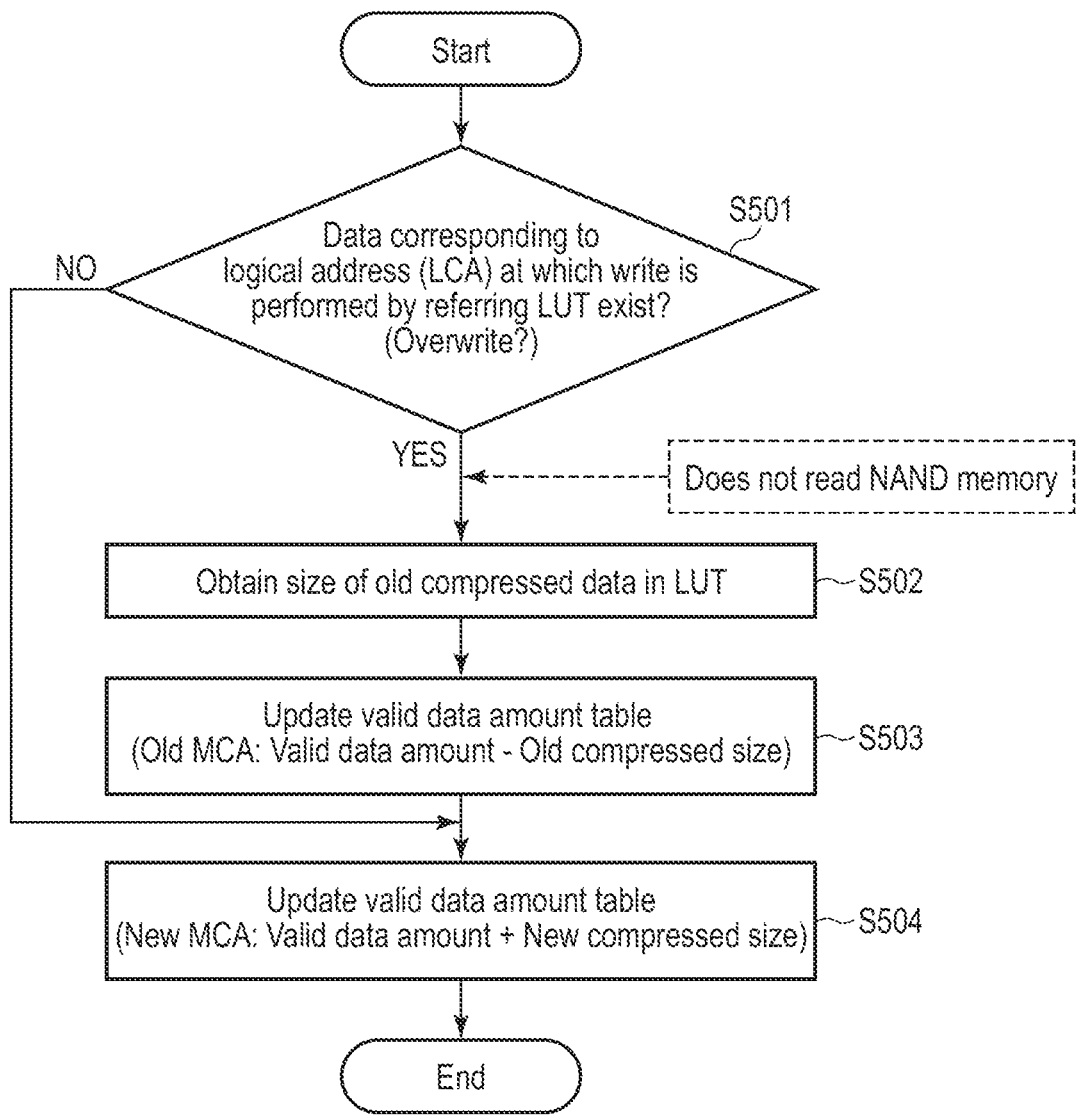
FIG. 12 is a flowchart of updating a valid data amount table of the memory system of the second embodiment.

Next, with reference to FIG. 12, update of the valid data amount table of the memory system 1 of the second embodiment will be explained.

As in the memory system 1 of the first embodiment described above, when a write command arrives, the CPU 111 first determines whether or not the old compressed data corresponding to the logical address specified by the command exist (whether or not it is an overwrite) (S501). Here, in the memory system 1 of the second embodiment, since the compressed size exists in the logical/physical conversion table (LUT), the CPU 111 does not perform read of the NAND memory 13 obtained the size of the old compressed data, and when first referring to LUT (to determine if it is overwritten or not), reads the size of the old compressed data from the LUT (S502). Although the capacity of the LUT is larger than in the case of memory system 1 of the first embodiment, read of the NAND memory 13 to read the size of the old compressed data (which takes longer than read of the LUT of DRAM 12) is no longer needed, resulting in improved drive performance compared to the memory system 1 of the first embodiment.

Thereafter, as in the memory system 1 of the first embodiment, the CPU 111 subtracts the old compression size from the number of valid data in the corresponding physical block (S503), and updates valid data amount of the physical block which is to be newly written (S504).

Figure 13:
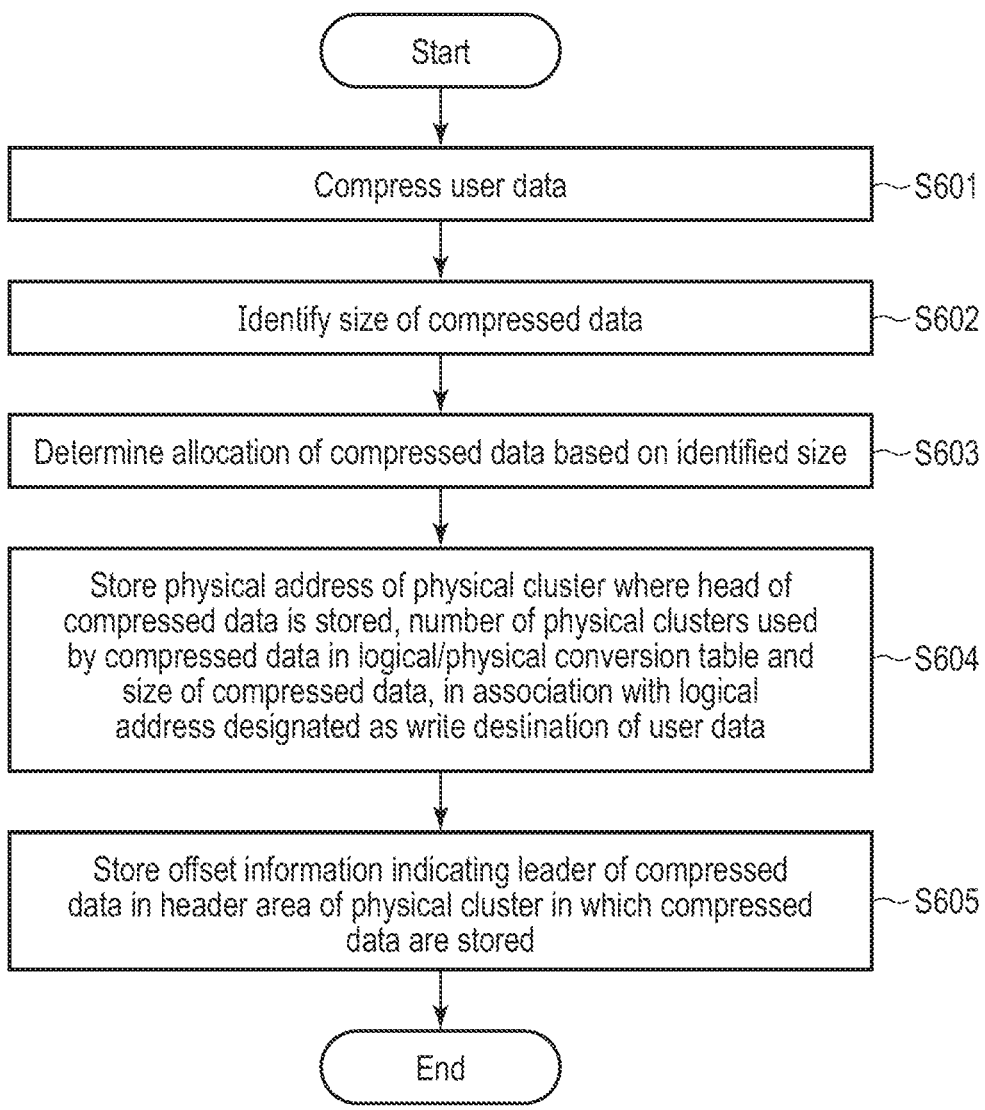
FIG. 13 is a flowchart of data compression operation of the memory system of the second embodiment.

FIG. 13 is a flowchart of data compression operation of the memory system 1 of the second embodiment.

The memory system 1 compresses user data from the host 2 (S601). The memory system 1 identifies the size of the compressed data (S602). The memory system 1 determines allocation of compressed data to the NAND memory 13 based on the specified size (S603).

The memory system 1 stores the physical address of the physical cluster where the head of the compressed data is stored, the number of physical clusters used by the compressed data, and the size of the compressed data, which are associated with the logical address designated as the write destination of user data, in the logical/physical conversion table (S604). Furthermore, the memory system 1 stores offset information indicating the leader of the compressed data in the header area of the physical cluster where the compressed data are stored (S605).

Figure 14:
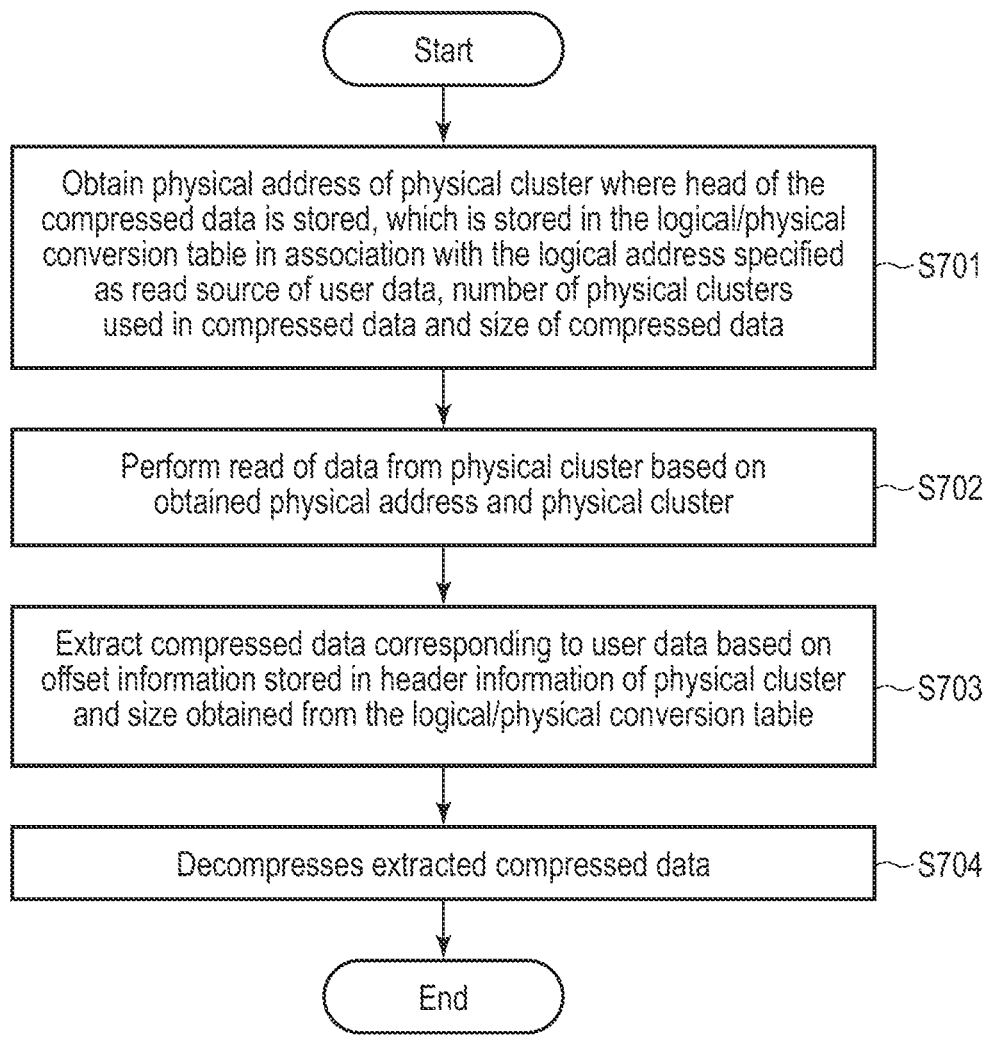
FIG. 14 is a flowchart of decompression operation of compressed data of the memory system of the second embodiment.

FIG. 14 is a flowchart of decompression operation of compressed data of the memory system 1.

The memory system 1 obtains the physical address of the physical cluster where the head of the compressed data is stored, which is stored in the logical/physical conversion table while being associated with the logical address specified as the read source of the user data, the number of physical clusters used in the compressed data, and the size of the compressed data (S701).

The memory system 1 performs read of data from the physical cluster based on the obtained physical address and physical cluster (S702). The memory system 1 extracts the compressed data corresponding to the user data from the read data based on the offset information stored in the header information of the physical cluster and the size obtained from the logical/physical conversion table (S703). The memory system 1 decompresses the extracted compressed data (S704).

As described above, in the memory system 1 of the second embodiment, only the offset information of the compressed data is stored in the header of the physical cluster of NAND memory 13, and the size of the compressed data is stored in the logical/physical conversion table. Therefore, although the size of the logical/physical conversion table increases slightly as compared to the memory system 1 of the first embodiment, it can further improve I/O performance by speeding up the update of the effective data amount table.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:
a nonvolatile memory; and
a controller which is communicable with a host and configured to control the nonvolatile memory, wherein the controller is configured to:
manage a first table maintaining a corresponding relationship between an address designated by the host and an address indicative of a physical position of the nonvolatile memory;
compress first data corresponding to a first address designated by a write command received from the host;
specify a size of second data obtained by compressing the first data;
determine allocation of the second data on the nonvolatile memory based on the size of the second data;
store a second address which is an address corresponding to a physical area where a head of the second data is stored and a physical area number used to store the second data in an entry corresponding to the first address of entries of the first table; and
store the first address, offset information indicative of a position of a leader of the second data in the physical area, and the size of the second data in a first area of the physical area where the second data are stored.

2. The memory system of claim 1, wherein, with respect to a read command by which the first address is designated, received from the host, the controller is configured to:
- read data including the second data from the physical area in which the second data of the nonvolatile memory are stored, based on the second address and the physical area number stored in the entry corresponding to the first address of the entries of the first table;
- extract the second data from the read data, based on the offset information and the size stored in the first area of the physical area where the second data are stored; and
- acquire the first data by decompressing the extracted second data.

3. The memory system of claim 2, wherein the first area is a constant length area in which the first address related to the second data of a first number, the offset information, and the size can be stored.

4. The memory system of claim 2, wherein:
- the controller is further configured to store data number information indicative of a number of the second data to be stored in the physical area in the first area; and
- the first area is a variable length area in which the data number information, the first address related to the second data which are the number indicated by the data number information, the offset information, and the size are stored.

5. The memory system of claim 4, wherein the controller is further configured to extract the second data from the read data based on the data number information.

6. A memory system comprising:
- a nonvolatile memory; and
- a controller which is communicable with a host and configured to control the nonvolatile memory, wherein the controller is configured to:
- manage a first table maintaining a corresponding relationship between an address designated by the host and an address indicative of a physical position of the nonvolatile memory;
- compress first data corresponding to a first address designated by a write command received from the host;
- specify a size of second data obtained by compressing the first data;
- determine allocation of the second data on the nonvolatile memory based on the size of the second data;
- store a second address which is an address corresponding to a physical area where a head of the second data is stored, a physical area number used to store the second data, and the size of the second data in an entry corresponding to the first address from entries of the first table; and
- store the first address and offset information indicative of a position of a leader of the second data in the physical area in a first area of the physical area where the second data are stored.

7. The memory system of claim 6, wherein, with respect to a read command by which the first address is designated, received from the host, the controller is configured to:
- read data including the second data from the physical area in which the second data of the nonvolatile memory are stored, based on the second address and the physical area number stored in the entry corresponding to the first address of the entries of the first table;
- extract the second data from the read data, based on the offset information stored in the first area of the physical area where the second data are stored and the size stored in the entry; and
- acquire the first data by decompressing the extracted second data.

8. The memory system of claim 7, wherein the first area is a constant length area in which the first address related to second data of a first number and the offset information can be stored.

9. The memory system of claim 7, wherein:
- the controller is further configured to store data number information indicative of a number of the second data to be stored in the physical area in the first area; and
- the first area is a variable length area in which the data number information, the first address related to the second data whose number is indicated by the data number information, and the offset information are stored.

10. The memory system of claim 9, wherein the controller is further configured to extract the second data from the read data based on the data number information.

11. The memory system of claim 6, wherein:
- the nonvolatile memory is a memory in which data overwrite is not performable to the physical area with already-written data, and is a memory to erase data per block formed of the physical areas of second number; and
- the controller is further configured to manage a second table in which a valid data amount of each block of the nonvolatile memory is maintained, based on a size stored in the first table.

12. A method of controlling a nonvolatile memory using a controller, the method comprising:
- managing a first table maintaining a corresponding relationship between an address designated by a host and an address indicative of a physical position of the nonvolatile memory;
- compressing first data corresponding to a first address designated by a write command received from the host;
- specifying a size of second data obtained by compressing the first data;
- determining allocation of the second data on the nonvolatile memory based on the size of the second data;
- storing a second address which is an address corresponding to a physical area where a head of the second data is stored and a physical area number used to store the second data in an entry corresponding to the first address of entries of the first table; and
- storing the first address, offset information indicative of a position of a leader of the second data in the physical area, and the size of the second data in a first area of the physical area where the second data are stored.

13. A method of claim 12, with respect to a read command by which the first address is designated, received from the host, the method further comprising:
- reading data including the second data from the physical area in which the second data of the nonvolatile memory are stored, based on the second address and the physical area number stored in the entry corresponding to the first address of the entries of the first table;
- extracting the second data from the read data, based on the offset information and the size stored in the first area of the physical area where the second data are stored; and
- acquiring the first data by decompressing the extracted second data.

14. A method of claim 13, further comprising storing data number information indicative of a number of the second data to be stored in the physical area in the first area,
- wherein the first area is a variable length area in which the data number information, the first address related to the second data which are the number indicated by the data number information, the offset information, and the size are stored.

15. A method of claim 14, further comprising extracting the second data from the read data based on the data number information.

16. A method of controlling a nonvolatile memory using a controller, the method comprising:
- managing a first table maintaining a corresponding relationship between an address designated by a host and an address indicative of a physical position of the nonvolatile memory;
- compressing first data corresponding to a first address designated by a write command received from the host;
- specifying a size of second data obtained by compressing the first data;
- determining allocation of the second data on the nonvolatile memory based on the size of the second data;
- storing a second address which is an address corresponding to a physical area where a head of the second data is stored, a physical area number used to store the second data, and the size of the second data in an entry corresponding to the first address from entries of the first table; and
- storing the first address and offset information indicative of a position of a leader of the second data in the physical area in a first area of the physical area where the second data are stored.

17. A method of claim 16, with respect to a read command by which the first address is designated, received from the host, the method further comprising:
- reading data including the second data from the physical area in which the second data of the nonvolatile memory are stored, based on the second address and the physical area number stored in the entry corresponding to the first address of the entries of the first table;
- extracting the second data from the read data, based on the offset information stored in the first area of the physical area where the second data are stored and the size stored in the entry; and
- acquiring the first data by decompressing the extracted second data.

18. A method of claim 17, further comprising storing data number information indicative of a number of the second data to be stored in the physical area in the first area,
- wherein the first area is a variable length area in which the data number information, the first address related to the second data which are the number indicated by the data number information, and the offset information are stored.

19. A method of claim 18, further comprising extracting the second data from the read data based on the data number information.

20. A method of claim 16, wherein:
- the nonvolatile memory is a memory in which data overwrite is not performable to the physical area with already-written data, and is a memory to erase data per block formed of the physical areas of second number; and
- the method further comprises managing a second table in which a valid data amount of each block of the nonvolatile memory is maintained, based on a size stored in the first table.

* * * * *